(12) United States Patent
Lee et al.

(10) Patent No.: US 11,050,066 B2
(45) Date of Patent: Jun. 29, 2021

(54) FUEL CELL WITH IMPROVED THERMAL DISTRIBUTION IN STACK

(71) Applicants: KOREA INSTITUTE OF SCIENCE AND TECHNOLOGY, Seoul (KR); INDUSTRY-ACADEMIC COOPERATION FOUNDATION, YONSEI UNIVERSITY, Seoul (KR)

(72) Inventors: Jong Ho Lee, Seoul (KR); Kyung Joong Yoon, Seoul (KR); Sang Hyeok Lee, Seoul (KR); Dong Hwan Kim, Seoul (KR); Jong Sup Hong, Seoul (KR); Yong Gyun Bae, Seoul (KR)

(73) Assignees: Korea Institute of Science and Technology, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 147 days.

(21) Appl. No.: 16/556,007

(22) Filed: Aug. 29, 2019

(65) Prior Publication Data

US 2020/0212456 A1    Jul. 2, 2020

(30) Foreign Application Priority Data

Dec. 26, 2018  (KR) .......................... 10-2018-0169046

(51) Int. Cl.
*H01M 8/0267* (2016.01)
*H01M 8/0263* (2016.01)
(Continued)

(52) U.S. Cl.
CPC ....... *H01M 8/0267* (2013.01); *H01M 8/0263* (2013.01); *H01M 8/04014* (2013.01);
(Continued)

(58) Field of Classification Search
CPC ............ H01M 8/2485; H01M 8/0267; H01M 8/04014; H01M 8/0263
See application file for complete search history.

(56) References Cited

U.S. PATENT DOCUMENTS 7,070,874 B2    7/2006  Blanchet et al.
9,343,756 B2 *  5/2016  Oh ...................... H01M 8/0263
(Continued)

FOREIGN PATENT DOCUMENTS

JP   2000012051 A   1/2000
JP   2008-510271 A  4/2008
(Continued)

OTHER PUBLICATIONS

Machine translation of KR 2018-0046411 (no date).*
Machine translation of JP 2000-012051 (no date).*

*Primary Examiner* — Amanda C. Walke
(74) *Attorney, Agent, or Firm* — Rabin & Berdo, P.C.

(57) ABSTRACT

Disclosed is a fuel cell with improved thermal distribution in a stack including two more unit cells stacked therein. The fuel cell includes a stack including the two more unit cells and separators each having manifolds formed through four sides thereof, a first chamber having an internal space so as to receive air and fuel from the outside and to transfer the air and fuel to a second chamber and so as to receive the air and fuel discharged from the stack and to discharge the air and fuel to the outside, a second chamber having an internal space so as to receive the air and fuel from the first chamber and to transfer the air and fuel to the stack, and a connecting part connecting the first chamber to the second chamber so as to allow the air and fuel to flow to the second chamber from the first chamber.

12 Claims, 10 Drawing Sheets

(51) Int. Cl.
*H01M 8/2485* (2016.01)
*H01M 8/04014* (2016.01)
*H01M 8/124* (2016.01)
*H01M 8/12* (2016.01)

(52) U.S. Cl.
CPC ............ *H01M 8/2485* (2013.01); *H01M 8/12* (2013.01); *H01M 2008/1293* (2013.01)

(56) References Cited

U.S. PATENT DOCUMENTS

| | | | | |
|---|---|---|---|---|
| 9,508,997 | B2* | 11/2016 | Kaeding | H01M 8/2465 |
| 10,461,353 | B2* | 10/2019 | Naito | H01M 8/242 |
| 2014/0093805 | A1* | 4/2014 | Dong | H01M 8/0282 |
| | | | | 429/456 |
| 2015/0340724 | A1* | 11/2015 | Roshanzamir | H01M 8/04291 |
| | | | | 429/465 |
| 2015/0372320 | A1* | 12/2015 | Choi | H01M 8/249 |
| | | | | 429/465 |
| 2016/0104911 | A1* | 4/2016 | Kurihara | H01M 8/2485 |
| | | | | 429/458 |
| 2018/0062195 | A1* | 3/2018 | Mure | H01M 8/2484 |
| 2018/0159156 | A1* | 6/2018 | Watanabe | H01M 8/2484 |
| 2019/0148757 | A1* | 5/2019 | Im | H01M 8/2485 |
| | | | | 429/479 |
| 2019/0296385 | A1* | 9/2019 | Sugihara | C25B 9/73 |

FOREIGN PATENT DOCUMENTS

| | | |
|---|---|---|
| JP | 2010165692 A | 7/2010 |
| KR | 10-1289112 B1 | 7/2013 |
| KR | 10-1322680 B1 | 10/2013 |
| KR | 10-2014-0125219 A | 10/2014 |
| KR | 1020180046411 A | 5/2018 |
| WO | 2007061075 A1 | 5/2007 |
| WO | 2015174386 A1 | 11/2015 |

* cited by examiner

FUEL CELL WITH IMPROVED THERMAL DISTRIBUTION IN STACK

CROSS-REFERENCE TO RELATED APPLICATION

This application claims under 35 U.S.C. § 119(a) the benefit of priority to Korean Patent Application No. 10-2018-0169046 filed on Dec. 26, 2018, the entire contents of which are incorporated herein by reference.

BACKGROUND

(a) Technical Field

The present disclosure relates to a fuel cell. More particularly, it relates to a fuel cell with improved thermal distribution in a stack including two more unit cells stacked therein.

(b) Background Art

A fuel cell, which is a device adapted to directly convert chemical energy into electric energy through electrochemical reaction, has advantages in that the energy efficiency thereof is remarkably high and in that there is almost no discharge of contaminants, compared to general thermal engines.

Among fuel cells, since a solid oxide fuel cell (SOFC) operates at a high temperature of 600 to 1000° C., it is possible to freely use hydrocarbon-based fuel as well as hydrogen through internal reforming without using a reformer. Furthermore, since the intrinsic fuel conversion efficiency of solid oxide fuel cell is as high as 45 to 65% and it is possible to realize system efficiency of 85% or higher through a cogeneration system using waste heat, solid oxide fuel cells are attracting a lot of attention as an environment-friendly power generation method to be used by future generations.

The solid oxide fuel cells may be broadly classified into a flat-plate solid oxide fuel cell and a cylindrical solid oxide fuel cell, depending on the shape of an electric cell thereof. The cylindrical solid oxide fuel cell is advantageous in terms of long-term stability, and the flat-plate solid oxide fuel cell is capable of realizing a high power density, compared to the cylindrical solid oxide fuel cell. These days, research on a flat-plate solid oxide fuel cell, which has the advantages of both cylindrical and flat-plate solid oxide fuel cells, is underway.

Since the solid oxide fuel cell is able to constitute a system having a capability of several watts to megawatts when a stack thereof is constructed using a connecting material and a sealing member, the fuel cell has recently attracted a lot of attention.

Although both the cylindrical and flat-plate solid oxide fuel cells have numerous advantages, there are disadvantages in that they are weak in thermomechanical properties related to sealing and in that thermal stability is lowered upon operation for a long period of time under high temperature.

By way of example, a solid oxide fuel cell, which is disclosed in Korean Patent Registration No. 10-1289112, is constructed such that gas (air and fuel) is introduced into the fuel cell through a lower part of the fuel cell and is discharged from the lower part through the stack of the fuel cell. In this case, because heat cannot be dissipated from the upper part of the fuel cell, the temperature difference between the lower part and the upper part of the fuel cell is increased as the number of unit cells in the stack is increased.

RELATED ART DOCUMENT

Patent Document (Patent Document 1) Korean Patent Registration No. 10-1289112

SUMMARY OF THE DISCLOSURE

The present invention has been made in an effort to solve the above-described problems associated with the prior art and it is an object of the present invention to provide a fuel cell having improved thermal distribution in a stack thereof.

The objects of the present invention are not limited to those mentioned above. It should be understood that the objects of the present invention will be become apparent from the following description and will be accomplished by the means disclosed in the accompanying claims and combinations thereof.

In one aspect, the present invention provides a fuel cell including a stack including two more unit cells and separators which are disposed on both surfaces of each of the unit cells and each of which has a rectangular shape when viewed in a plan view, each of the separators being provided through four sides thereof with manifolds, a first chamber, which is disposed on one surface of the stack and has an internal space having a predetermined volume so as to receive air and fuel from an outside and to transfer the air and fuel to a second chamber and so as to receive the air and fuel discharged from the stack and to discharge the air and fuel to the outside, a second chamber, which is disposed on another surface of the stack, which is opposite the one surface of the stack and has an internal space having a predetermined volume so as to receive the air and fuel supplied from the first chamber and to transfer the air and fuel to the stack, and a connecting part, which is disposed outside the stack so as to connect the first chamber to the second chamber and which defines therein a space through which the air and fuel flow to the second chamber from the first chamber.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The objects described above, and other objects, features and advantages will be clearly understood from the following preferred embodiments with reference to the attached drawings. However, the present invention is not limited to the embodiments and will be embodied in different forms. The embodiments are suggested only to enable thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

Figure 1:
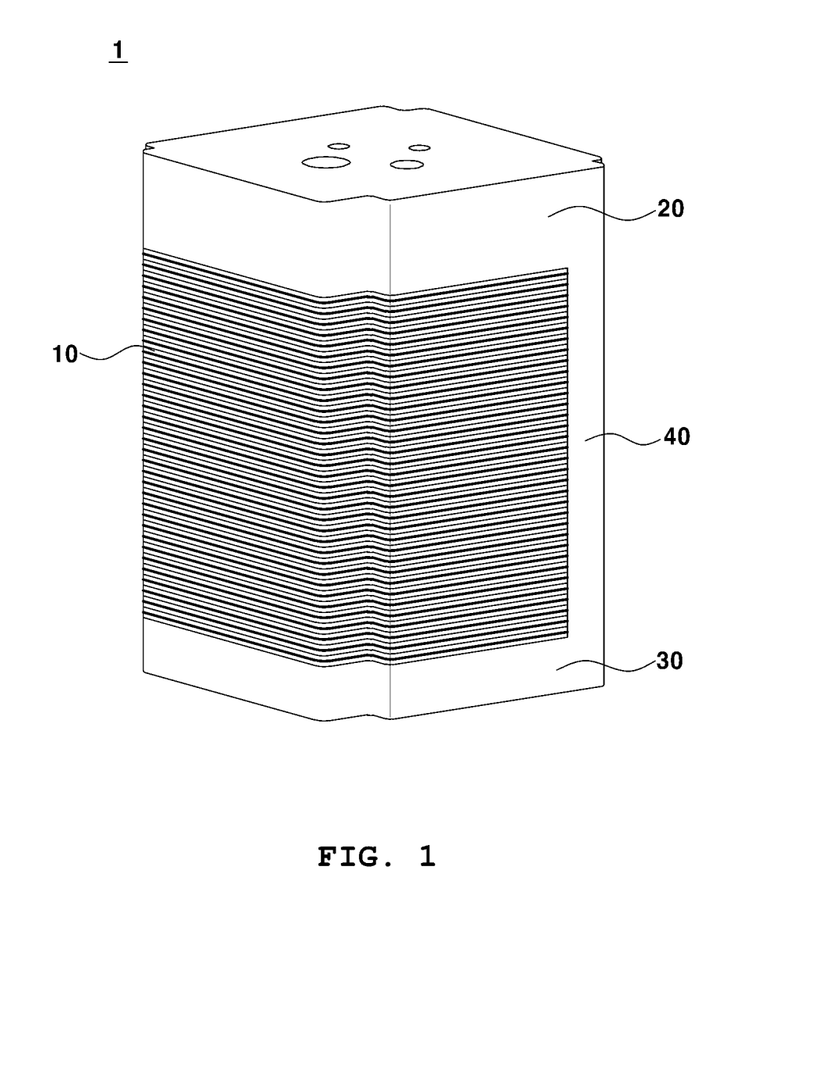
FIG. 1 is a perspective view schematically illustrating a fuel cell according to the present invention.

FIG. 1 is a perspective view schematically illustrating a fuel cell 1 according to the present invention. Referring to the drawing, the fuel cell 11 includes a stack 10 in which a plurality of unit cells and separators are alternately stacked one on top of another, a first chamber 20, which is disposed on one side surface of the stack 10 and has an internal space having a predetermined volume, so as to receive air and fuel from the outside and to transfer them to a second chamber 30 and so as to receive the air and fuel and to discharge them to the outside, the second chamber 30, which is disposed on the side surface opposite the one side surface of the stack 10 and has an internal space having a predetermined volume so as to transfer the air and fuel, supplied from the first chamber 20, to the stack 10, and a connecting part 40, which connects the first chamber 20 to the second chamber 30 and defines therein a space through which the air and fuel are transferred from the first chamber 20 to the second chamber 30.

Hereinafter, the components of the fuel cell 1 according to the present invention will be described in detail.

Figure 2:
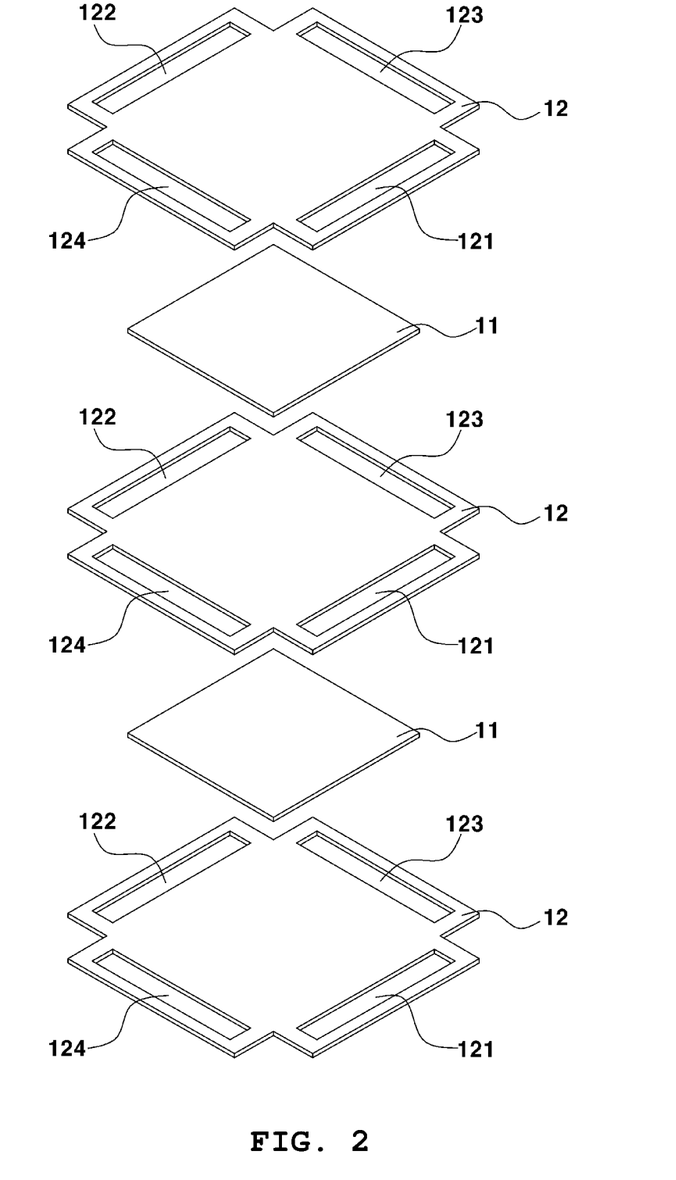
FIG. 2 is an exploded perspective view of a stack according to the present invention.

FIG. 2 is an exploded perspective view of the stack 10 according to the present invention. Referring to the drawing, the stack 10 includes two or more unit cells 11 and separators 12 disposed on both surfaces of each of the unit cells.

Specifically, the stack 10 may be constructed such that the plurality of unit cells 11 and the plurality of separators are alternately stacked one on top of another. Each of the unit cells 11 may include an air electrode, an electrolytic layer and a fuel electrode. For example, the hydrogen supplied to the anode of one unit cell 11 is divided into a hydrogen ion and an electron. The electron is transferred to the air electrode via an external circuit, and oxygen obtains the electron at the air electrode, resulting in an oxygen ion. The oxygen ion moves to the fuel electrode through the electrolytic layer, and then binds with the hydrogen ion, thereby creating water as reaction product. In other words, one unit cell 11 produces electric power through chemical binding reaction, and the fuel electrode and the air electrode become the positive electrode and the negative electrode of the unit cell 10, respectively.

The stack 10 may be classified into a polymer electrolyte membrane fuel cell (PEMFC), a phosphoric acid fuel cell (PAFC), an alkali fuel cell (AFC), a molten carbonate fuel cell (MCFC) and a solid oxide fuel cell (SOFC), depending on the kind of the electrolytic layer included in the unit cell. The stack 10 may include the above-mentioned kind of unit cell, and may be a stack of a solid oxide fuel cell (SOFC).

Figure 3:
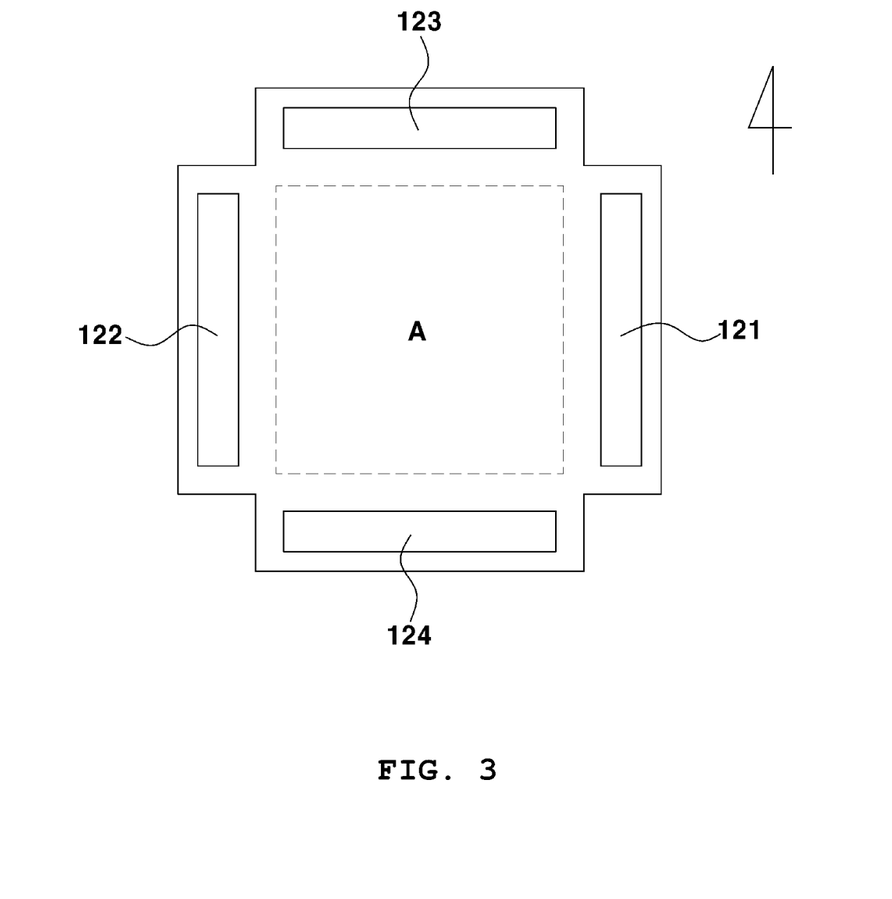
FIG. 3 is a plan view schematically illustrating a separator.

FIG. 3 is a plan view schematically illustrating the separator 12. The separator 12 may be configured to have a square shape, that is, a square shape, each of the corners of which is cut out so as to define an "L" shape, and may be respectively provided in the four sides thereof with manifolds 121, 122, 123 and 124 when viewed in a plan view.

The separator 12 may be divided into the central part A, which is brought into contact with the unit cell 11, and the peripheral part around the central part A. Except for the corner portions, each of which is cut out so as to define an "L" shape, the four sides of the peripheral part may be provided therethrough with the manifolds through which air and fuel are introduced and discharged.

Specifically, the separator 12 may include an air introduction manifold 121 formed in one side thereof, an air discharge manifold 122 formed in the side thereof opposite the air introduction manifold 121, a fuel introduction manifold 123 formed in another side thereof, and a fuel discharge manifold 124 formed in the side thereof opposite the fuel introduction manifold 123.

The air introduction manifold 121 is a component that is formed through one side of the separator 12 so as to allow air to be introduced into the stack 10 from the second chamber 30.

The air discharge manifold 122 is a component that is formed through the side of the separator 12 opposite the air introduction manifold 121 so as allow to the air to be discharged to the first chamber 20 from the stack 10.

The fuel introduction manifold 123 is a component that is formed through another side of the separator 12 so as to allow fuel to be introduced into the stack 10 from the second chamber 30.

The fuel discharge manifold 124 is a component that is formed through the side of the separator 12 opposite the fuel introduction manifold 123 so as to allow the fuel to be discharged to the first chamber 20 from the stack 10.

Figure 4:
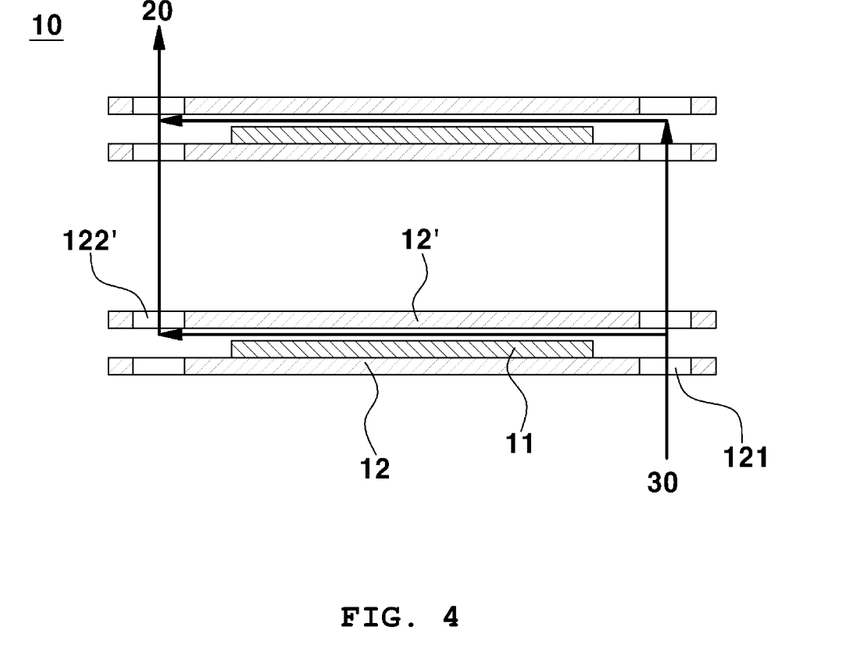
FIG. 4 is a reference view explaining the flow of air in the stack.

FIG. 4 is a reference view explaining the flow of air in the stack 10. Air is first introduced through the air introduction manifold 121 in the separator 12 that is positioned at the lowest level of the stack 10 from the second chamber 30. The introduced air passes over the unit cell 11 and is then discharged to the first chamber 20 through the air discharge manifold 122' in the separator 12', which is positioned adjacent to the lowermost separator 12 and is formed in the side opposite the air introduction manifold 121.

The flow of fuel in the stack 10 is similar to the flow of air in the stack 10. Fuel is introduced from the second chamber 30 through the fuel introduction manifold 123 in the separator 12 that is positioned immediately adjacent to the second chamber 30, that is, through the fuel introduction manifold 123 in the lowermost separator 12. The introduced fuel passes over the unit cell 11 and is then discharged to the first chamber 20 through the fuel discharge manifold 124' in the adjacent separator 12', which is formed in the side opposite the fuel introduction manifold 123.

As previously described, a conventional fuel cell is typically constructed such that an inlet and an outlet for the gas (air and fuel) in the stack are positioned at a lower level of the stack. Hence, because heat cannot be dissipated from the upper portion of the stack, there is a great temperature difference between the lower portion and the upper portion of the stack. In contrast, the fuel cell 1 according to the present invention is technically characterized in that the temperature difference in the stack is drastically reduced by positioning the inlet for gas (air and fuel) at a lower level of the stack while positioning the outlet for gas at an upper level of the stack.

The positions of the air introduction manifold 121 and the fuel introduction manifold 123 in the four sides of the separator 12 may be changed depending on the relationships with the other components such as the first chamber, the connecting part and the second chamber. Once the positions of the air introduction manifold 121 and the fuel introduction manifold 123 are determined, the positions of the other manifolds 122 and 124, which are positioned opposite these manifolds are also determined.

The shapes, the sizes and the number of manifolds 121, 122, 123 and 124 are not particularly limited. For example, each of the manifolds may be composed of a plurality of manifolds, each of which has a predetermined shape.

Figure 5:
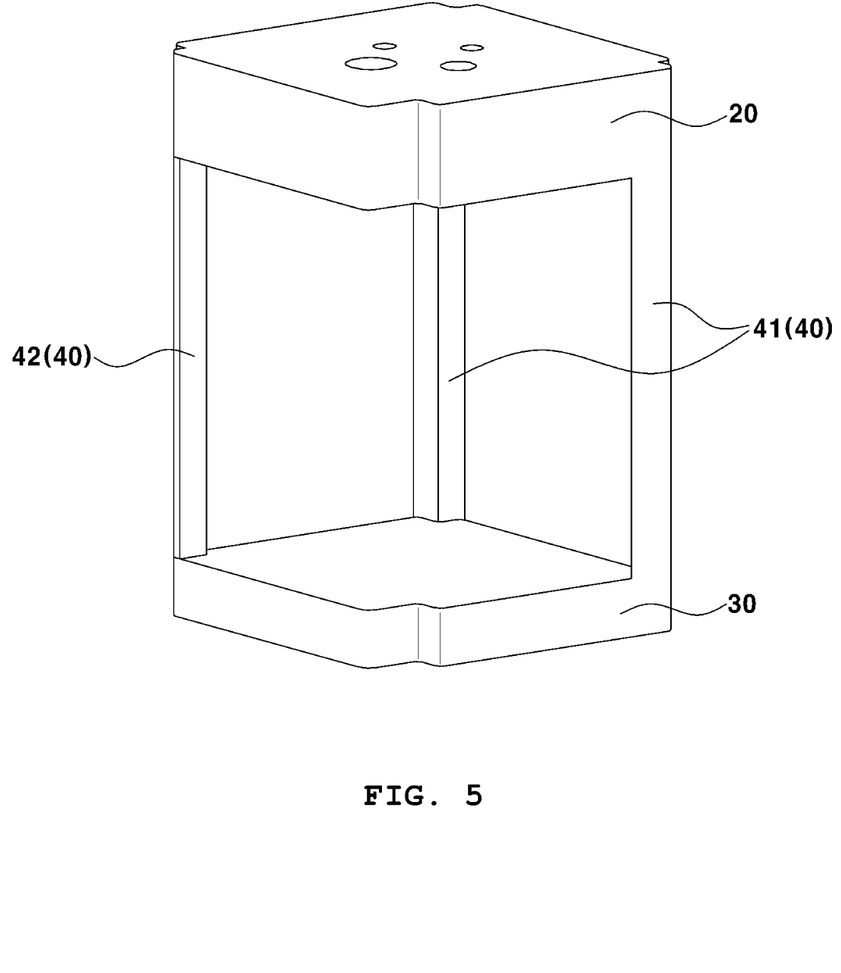
FIG. 5 is a perspective view schematically illustrating the remaining construction of the fuel cell excluding the stack.

FIG. 5 is a perspective view schematically illustrating the remainder of the construction of the fuel cell 1, excluding the stack 10.

The first chamber 20 is a component that is positioned at one side of the stack 10, for example, at an upper side of the stack 10, and defines an internal space having a predetermined volume so as to allow air and fuel introduced from the outside, to remain therein for a predetermined period of time.

Figure 6:
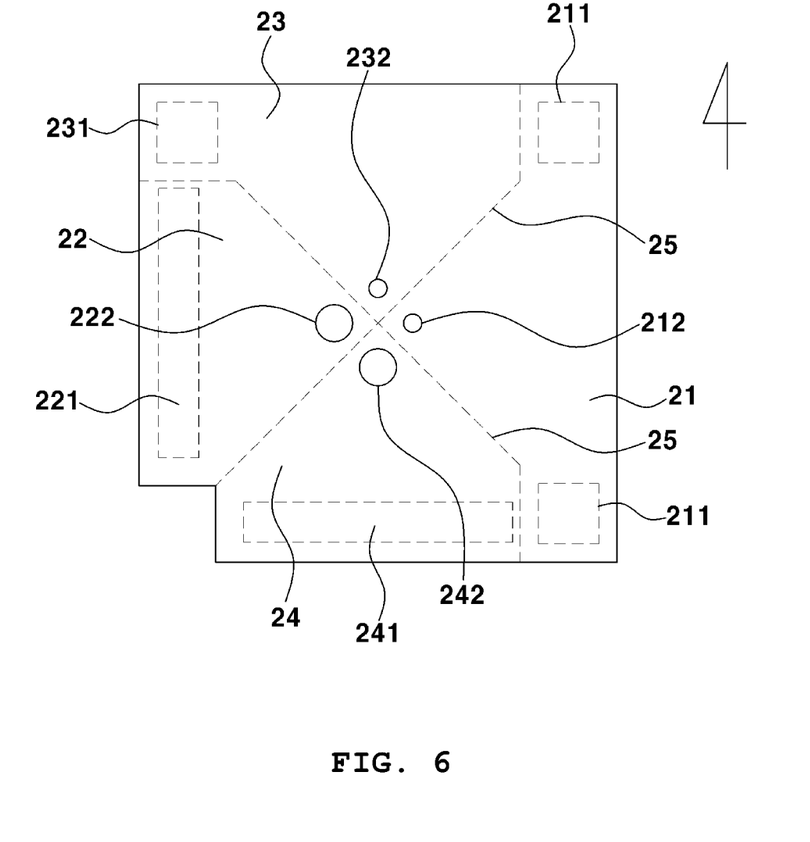
FIG. 6 is a plan view of a first chamber.
Figure 7:
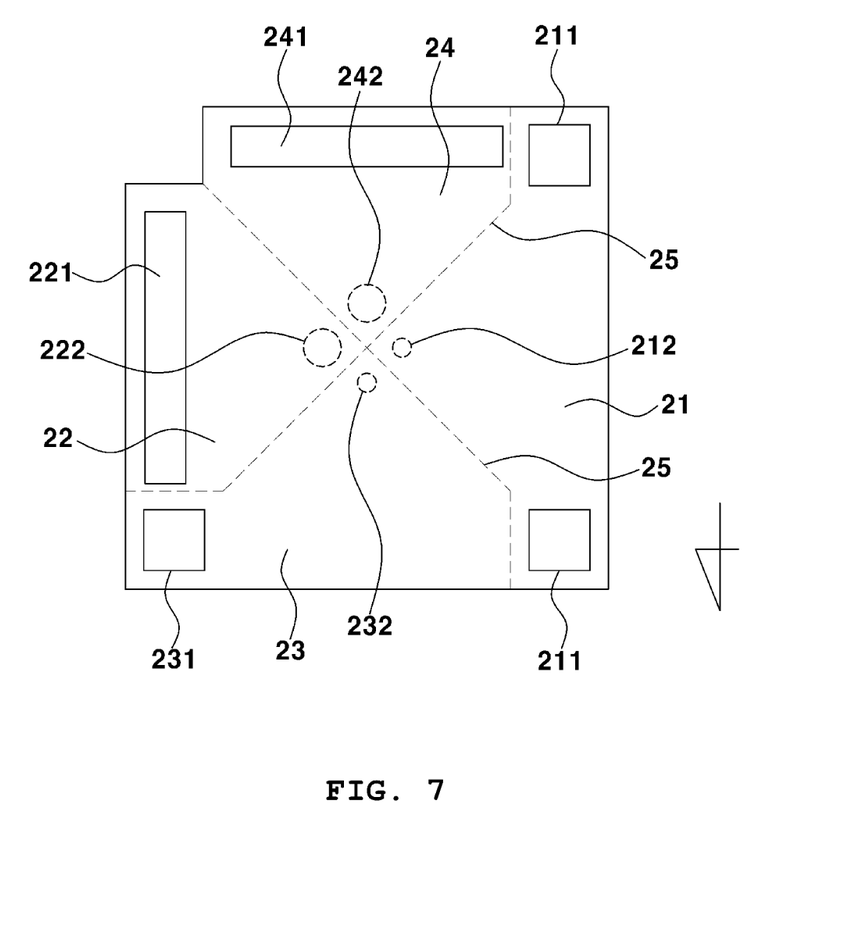
FIG. 7 is a bottom view of the first chamber.

FIG. 6 is a plan view of the first chamber 20. FIG. 7 is a bottom view of the first chamber 20. In FIGS. 6 and 7, elements that are actually visible to a viewer, are indicated by solid lines, and the remaining internal elements in the first chamber 20 are indicated by dotted lines. The reason for this is for convenience of explanation. The external and internal structures of the first chamber 20 will be clearly understood from FIGS. 6 and 7 by a person having ordinary skill in the art to which the present invention pertains. Furthermore, in order to enable the three-dimensional structure of the first chamber 20 to be easily perceived, FIGS. 6 and 7 are additionally provided with an orientation representation based on FIG. 1.

The first chamber 20 has a certain hexahedral shape. Specifically, the first chamber 20 has a hexahedral shape in which one corner portion thereof is cut out vertically so as to define an "L" shape.

The first chamber 20 includes a first vertical partition 25, which extends between the corner portions, which are positioned diagonally opposite each other, so as to partition the internal space in the first chamber 20 into a first retaining space 21, a second retaining space 22, a third retaining space 23 and a fourth retaining space 24.

The term "corner portion" used herein is to be construed as indicating not only the corner as defined in a dictionary but also the region around the corner. Furthermore, the term "partition" used herein means completely isolating the first to fourth retaining spaces 21 to 24 from one another so as to prevent fluid in the retaining spaces from mixing.

Hereinafter, the first retaining space 21, the second retaining space 22, the third retaining space 23 and the fourth retaining space 24 will be defined.

In the lower wall of the first chamber 20, first air communication holes 211 are formed through the corner portion that is disposed opposite the corner portion that is cut out so as to define an "L" shape, and through one of corner portions adjacent to the cut corner portion, and a first fuel communication hole 231 is formed through the other of the adjacent corner portions.

The space, which is partitioned by the first partition 25 and in which the first air communication holes 211 are formed, is the first retaining space 21. The first retaining space 21 includes an air introduction hole 212 formed through the upper wall.

The space that is opposite the first retaining space 21 is the second retaining space 22. The second retaining space 22 includes an air discharge manifold communication hole 221 formed through the lower wall and an air discharge hole 222 formed through the upper wall.

The space, which is partitioned by the first partition 25 and in which the first fuel communication hole 231 is formed, is the third retaining space 23. The third retaining space 23 includes an air discharge hole 232 formed through the upper wall.

The space that is opposite the third retaining space 23 is the fourth retaining space 24. The fourth retaining space 24 includes a fuel discharge manifold communication hole 241 formed through the lower wall and a fuel discharge hole 242 formed through the upper wall.

In short, the first retaining space 21 is a space in which the air that has been introduced thereinto through the air introduction hole 212 remains for a predetermined period of time before flowing into the second chamber 30 through the first air communication holes 211.

The second retaining space 22 is a space in which the air that has been discharged from the stack and introduced thereinto through the air discharge manifold communication hole 221 retains for a predetermined period of time before being discharged through the air discharge hole 222.

The third retaining space 23 is a space in which the air that has been introduced thereinto through the fuel introduction hole 232 retains for a predetermined period of time before flowing into the second chamber 30 through the first fuel communication hole 231.

The fourth retaining space 24 is a space in which the fuel that has been discharged from the stack and introduced into the fuel discharge manifold communication hole 241 retains for a predetermined period of time before discharging through the fuel discharge hole 242.

Here, low-temperature external air, which is introduced into the first retaining space 21 through the air introduction hole 212, and low-temperature external fuel, which is introduced into the third retaining space 23 through the fuel introduction hole 232, exchange heat with high-temperature air, which is introduced into the second retaining space 22 from the stack through the air discharge manifold communication hole 221, and high-temperature fuel, which is introduced into the fourth retaining space 24 from the stack through the fuel discharge manifold communication hole 241.

In order to more efficiently perform the heat exchange, the diameter of the air introduction hole 212 may be set to be smaller than the diameter of the air discharge hole 222, and the diameter of the fuel introduction hole 232 may be set to be smaller than the diameter of the fuel discharge hole 242.

The second chamber 30 is a component that is positioned at the side of the stack 10 that is opposite the side of the stack 10 at which the first chamber 20 is positioned, that is, at the lower side of the stack 10, and which transfers the air and fuel that are supplied from the first chamber 20 through the connecting part 40 to the stack 10. The second chamber 30 has an internal space having a predetermined volume in which the air and fuel remain for a predetermined period of time.

Figure 8:
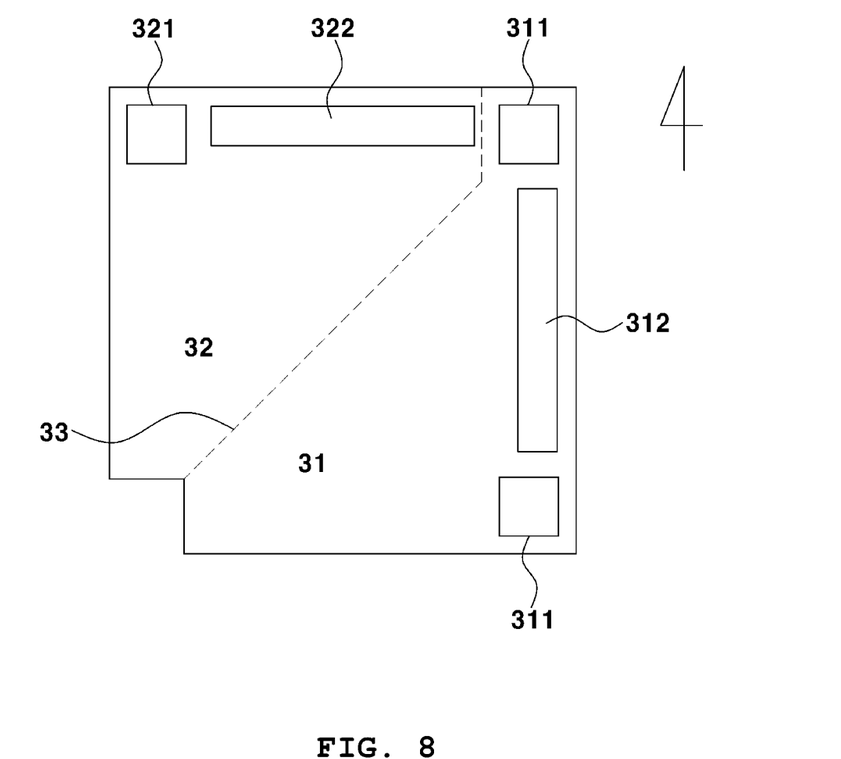
FIG. 8 is a plan view of a second chamber.

FIG. 8 is a plan view of the second chamber 30. In the drawing, elements that are actually visible to a viewer, are indicated by solid lines, and the remaining internal elements in the second chamber 30 are indicated by dotted lines. The reason for this is for convenience of explanation. The external and internal structures of the second chamber 30 will be clearly understood from FIG. 8 by a person having ordinary skill in the art to which the present invention pertains. Furthermore, in order to enable the three-dimensional structure of the second chamber 30 to be easily perceived, FIG. 8 is additionally provided with an orientation representation based on FIG. 1.

The second chamber 30 has a certain hexahedral shape. Specifically, the second chamber 30 has a hexahedral shape in which one corner portion thereof is cut out vertically so as to define an "L" shape.

The second chamber 30 includes a second vertical partition 33, which extends between the corner portions, which are positioned diagonally opposite each other, so as to partition the internal space in the second chamber 30 into a fifth retaining space 31 and a sixth retaining space 32.

The fifth retaining space 31 includes second air communication holes 311, which are formed through the upper wall thereof so as to allow the fifth retaining space 21 to communicate with the connecting part 40, and an air introduction manifold communication hole 312, which is formed through the upper wall thereof so as to allow the fifth retaining space 31 to communicate with the air introduction manifold 121 in the separator 12.

The sixth retaining space 32 includes a second fuel communication hole 321, which is formed through the upper wall thereof so as to allow the sixth retaining space 32 to communicate with the connecting part 40, and a fuel introduction manifold communication hole 322, which is formed through the upper wall thereof so as to allow the sixth retaining space 32 to communicate with the fuel introduction manifold 123 in the separator 12.

The connecting part 40 includes air connecting parts 41, which are linear flow passages connecting the first chamber 20 to the second chamber 30 so as to allow the air, introduced into the first chamber, to flow into the second chamber 30, and a fuel connecting part 42, which is a linear flow passage connecting the first chamber 20 to the second chamber 30 so as to allow the fuel, introduced into the first chamber 20, to flow into the second chamber 30.

Specifically, the air connecting parts 41 connect the first air communication holes 211 to the second air communication holes 311, and the fuel connecting part 42 connects the first fuel communication hole 231 to the second fuel communication hole 321.

Referring to FIGS. 1 and 5, the fuel cell 1 according to the present invention is constructed such that the stack 10 is interposed between the first chamber 20 and the second chamber 30 in the state in which the corners of the separator 12, which are cut out so as to define an "L" shape, are in contact with the outer peripheral surfaces of the air connecting parts 41 and the fuel connecting part 42. Consequently, heat generated by the stack 10 is transferred to the connecting part 40, which is positioned at an outer portion of the stack 10, thereby performing heat exchange.

The air and fuel that are respectively introduced into the fifth retaining space 31 and the sixth retaining space 32 in the second chamber 30 through the connecting part 40 exchange heat with each other while remaining therein for a predetermined period of time before being introduced into the stack.

Figure 9:
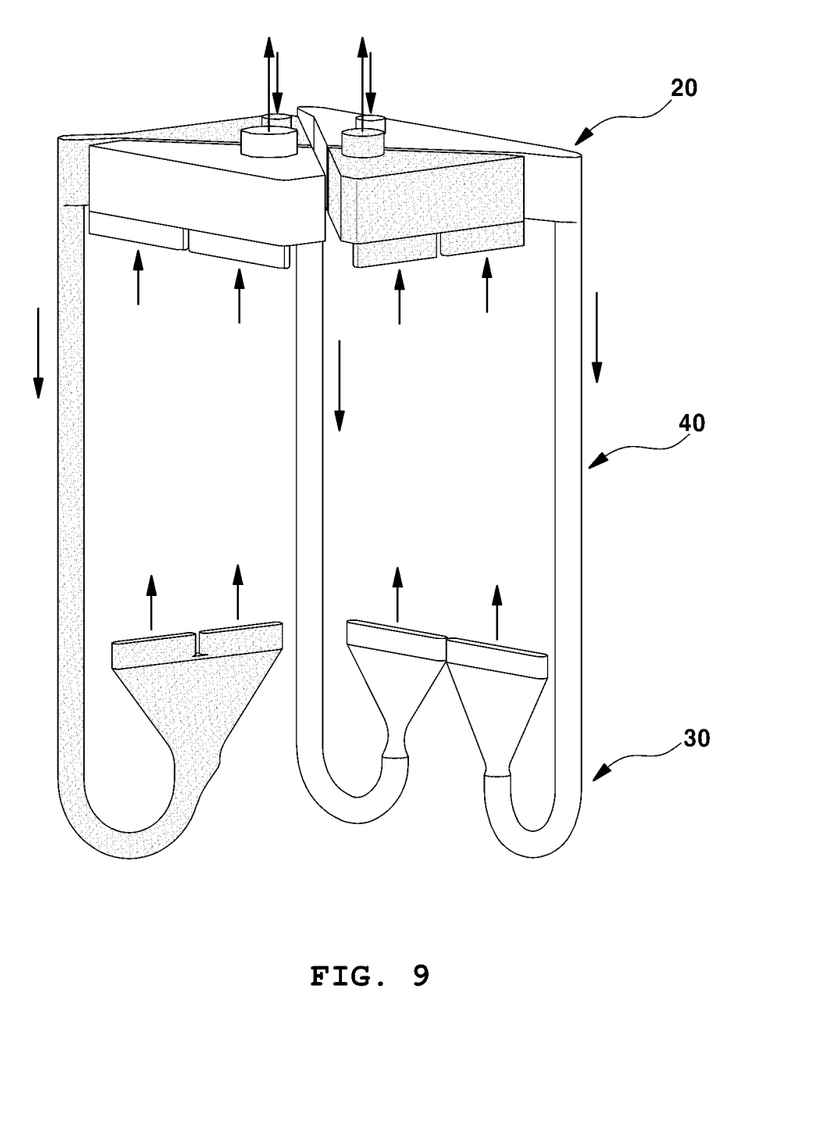
FIG. 9 is a view schematically illustrating the flow of air and fuel in the fuel cell according to the present invention.

FIG. 9 is a view schematically illustrating the flow of air and fuel in the fuel cell 1 according to the present invention. For convenience of explanation, only the flow of fluid is illustrated in the drawing. Referring to FIG. 9 and the above disclosure, the fuel cell 1 according to the present invention is constructed such that heat exchange is performed in the first chamber 20, the second chamber 30 and the connecting part 40. Accordingly, it is possible to minimize a temperature difference between the components in the stack 10, and thus to minimize heat stress to the entire stack 10.

Figure 10:
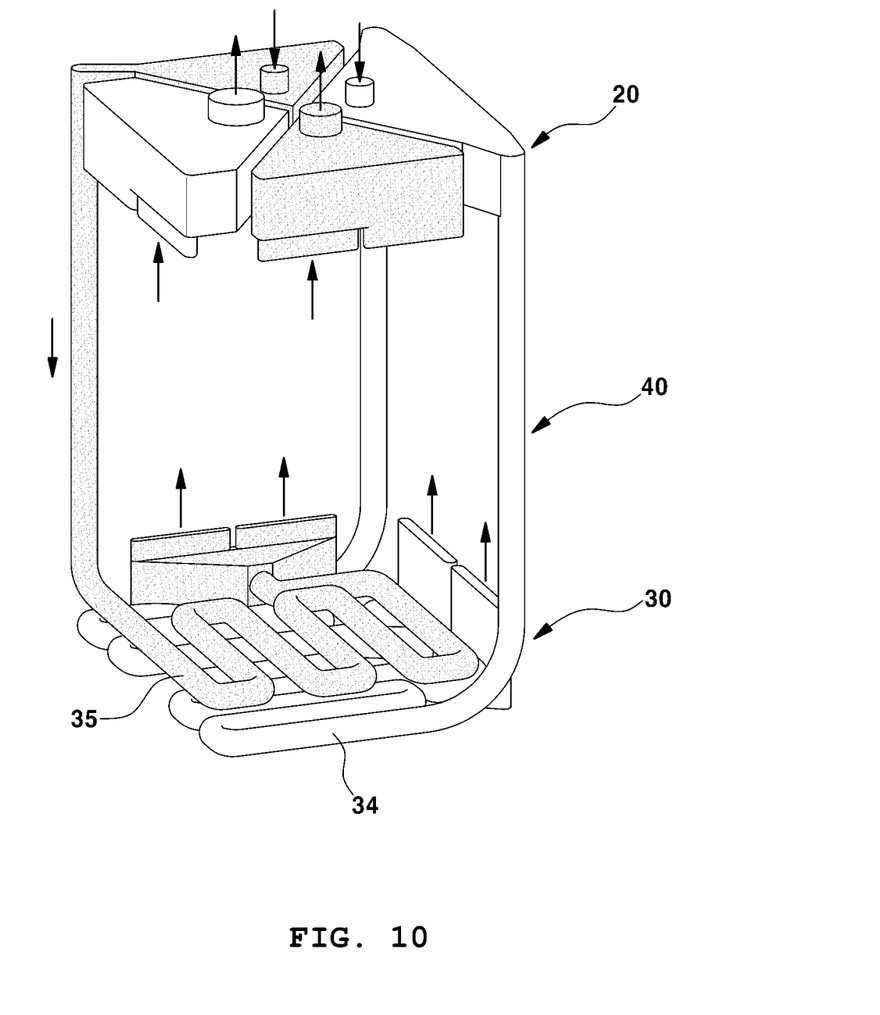
FIG. 10 is a view illustrating the flow of fluid in the fuel cell, which is provided with another embodiment of the second chamber.

FIG. 10 is a view illustrating the flow of fluid in the fuel cell, which is provided with another embodiment of the second chamber 30. Referring to the drawing, the second chamber 30 may be provided in the internal space thereof with heat exchange air flow passages 34, each of which is connected at one end to a corresponding one of the air connecting parts and is connected at the other end to a corresponding one of the manifolds and each of which includes linear zones and curved zones which are alternately arranged, and a heat exchange fuel flow passage 35, which is connected at one end thereof to the fuel connecting part and is connected at the other end thereof to another one of the manifolds and which includes alternately arranged linear zones and curved zones.

As is apparent from the above description, the fuel cell according to the present invention has excellent long-term stability because there is a small temperature difference between the upper part and the lower part of the stack.

The effects of the present invention are not limited to those mentioned above. It should be understood that the effects of the present invention include all effects that can be inferred from the foregoing description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell comprising:
  a stack including two more unit cells and separators which are disposed on both surfaces of each of the unit cells and each of which has a rectangular shape when viewed in a plan view, each of the separators being provided through four sides thereof with manifolds;
  a first chamber, which is disposed on one surface of the stack and has an internal space having a predetermined volume so as to receive air and fuel from the outside and to transfer the air and fuel to a second chamber and so as to receive the air and fuel discharged from the stack and to discharge the air and fuel to the outside;
  a second chamber, which is disposed on another surface of the stack, which is opposite the one surface of the stack and has an internal space having a predetermined volume so as to receive the air and fuel supplied from the first chamber and to transfer the air and fuel to the stack; and
  a connecting part, which is disposed outside the stack so as to connect the first chamber to the second chamber and which defines therein a space through which the air and fuel flow to the second chamber from the first chamber.

2. The fuel cell of claim 1, wherein each of the separators includes an air introduction manifold formed in one side thereof, an air discharge manifold formed in a side thereof opposite the air introduction manifold, a fuel introduction manifold formed in another side thereof, and a fuel discharge manifold formed in a side thereof opposite the fuel introduction manifold.

3. The fuel cell of claim 2, wherein the air that is introduced into the stack from the second chamber through the air introduction manifold passes over the unit cells and is discharged to the first chamber through the air discharge manifold, which is disposed opposite the air introduction manifold, and
  wherein the fuel that is introduced into the stack from the second chamber through the fuel introduction manifold passes over the unit cells and is discharged to the first chamber through the fuel discharge manifold that is disposed opposite the fuel introduction manifold.

4. The fuel cell of claim 1, wherein the first chamber has a hexahedral shape and includes a first vertical partition, which extends between corner portions, which are positioned diagonally opposite each other, so as to partition an internal space in the first chamber into a first retaining space, a second retaining space, a third retaining space and a fourth retaining space.

5. The fuel cell of claim 4, wherein the first retaining space is opposite the second retaining space, and the third retaining space is opposite the fourth retaining space,
  wherein the first retaining space includes an air introduction hole formed through an upper wall thereof and first air communication holes formed through a lower wall thereof for communication of the first retaining space with the connecting part,
  wherein the second retaining space includes an air discharge manifold communication hole formed through a lower wall thereof for communication of the second retaining space with the manifold in the separator and an air discharge hole formed through an upper wall thereof,
  wherein the third retaining space includes a fuel introduction hole formed through an upper wall thereof and a first fuel communication hole formed through a lower wall thereof for communication of the third retaining space with the connecting part, and
  wherein the fourth retaining space includes a fuel discharge manifold communication hole formed through a lower wall thereof for communication of the fourth retaining space with the manifold in the separator and a fuel discharge hole formed through an upper wall thereof.

6. The fuel cell of claim 5, wherein low-temperature external air, which is introduced into the first retaining space through the air introduction hole, and low-temperature external fuel, which is introduced into the third retaining space through the fuel introduction hole, exchange heat with high-temperature air, which is introduced into the second retaining space from the stack through the air discharge manifold communication hole, and high-temperature fuel, which is introduced into the fourth retaining space from the stack through the fuel discharge manifold communication hole.

7. The fuel cell of claim 1, wherein the second chamber has a predetermined hexahedral shape and includes a second vertical partition, which extends between corner portions, which are positioned diagonally opposite each other, so as to partition an internal space in the second chamber into a fifth retaining space and a sixth retaining space.

8. The fuel cell of claim 7, wherein the fifth retaining space includes second air communication holes formed through an upper wall thereof for communication of the fifth retaining space with the connecting part and an air introduction manifold communication hole formed through the upper wall thereof for communication of the fifth retaining space with the air introduction manifold in the separator, and
  wherein the sixth retaining space includes a second fuel communication hole formed through an upper wall thereof for communication of the sixth retaining space with the connecting part and a fuel introduction manifold communication hole formed through the upper wall thereof for communication of the sixth retaining space with the fuel introduction manifold in the separator.

9. The fuel cell of claim 1, wherein the connecting part includes:
  air connecting parts, which are linear flow passages connecting the first chamber to the second chamber so as to allow the air, introduced into the first chamber from the outside, to flow into the second chamber; and a fuel connecting part, which is a linear flow passage connecting the first chamber to the second chamber so as to allow the fuel, introduced into the first chamber, to flow into the second chamber.

10. The fuel cell of claim 9, wherein the first chamber is cut out at one corner thereof so as to define an "L" shape in a lower surface thereof and includes first air communication holes formed through a lower wall of a corner that is disposed opposite the cut corner and through one of corner portions adjacent to the cut corner portion, and a first fuel communication hole formed through a lower wall of a remaining one of the adjacent corner portions, wherein the second chamber has an upper surface, which is symmetrical with the lower surface of the first chamber, and includes second air communication holes, which are formed through an upper wall thereof so as to be symmetrical with the first air communication holes, and a second fuel communication hole, which is formed through the upper wall thereof so as to be symmetrical with the first fuel communication hole, and wherein air connecting parts connect the first air communication holes to the second air communication hole, and the fuel connecting part connects the first fuel communication hole to the second fuel communication hole.

11. The fuel cell of claim 10, wherein each of the separators has a rectangular shape, which is cut out at corners thereof so as to define an "L" shape in each of the corners, the stack being interposed between the first chamber and the second chamber in a state in which some of the cut corners of the separator are in contact with outer peripheral surfaces of the air connecting parts and the fuel connecting part, whereby heat from the stack is transferred to the air connecting parts and the fuel connecting part.

12. The fuel cell of claim 9, wherein the second chamber has a predetermined hexahedral shape, and wherein the second chamber is provided in an internal space thereof with heat exchange air flow passages, each of which is connected at one end to a corresponding one of the air connecting parts and is connected at a remaining end to a corresponding one of the manifolds, and each of which includes linear zones and curved zones which are alternately arranged, and a heat exchange fuel flow passage, which is connected at one end thereof to the fuel connecting part and is connected at a remaining end thereof to another one of the manifolds, and which includes linear zones and curved zones which are alternately arranged.

* * * * *